Patented Dec. 26, 1922.

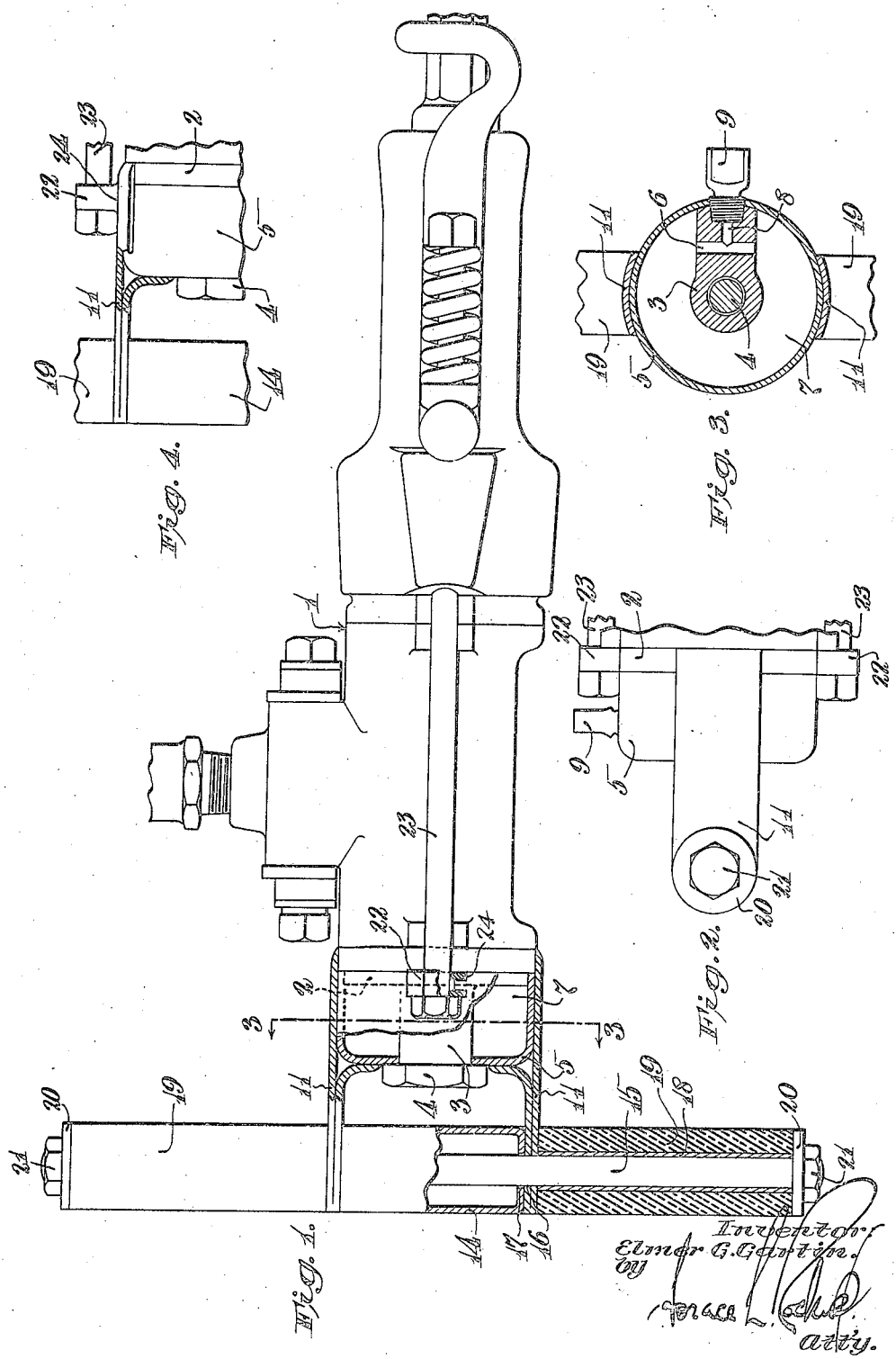

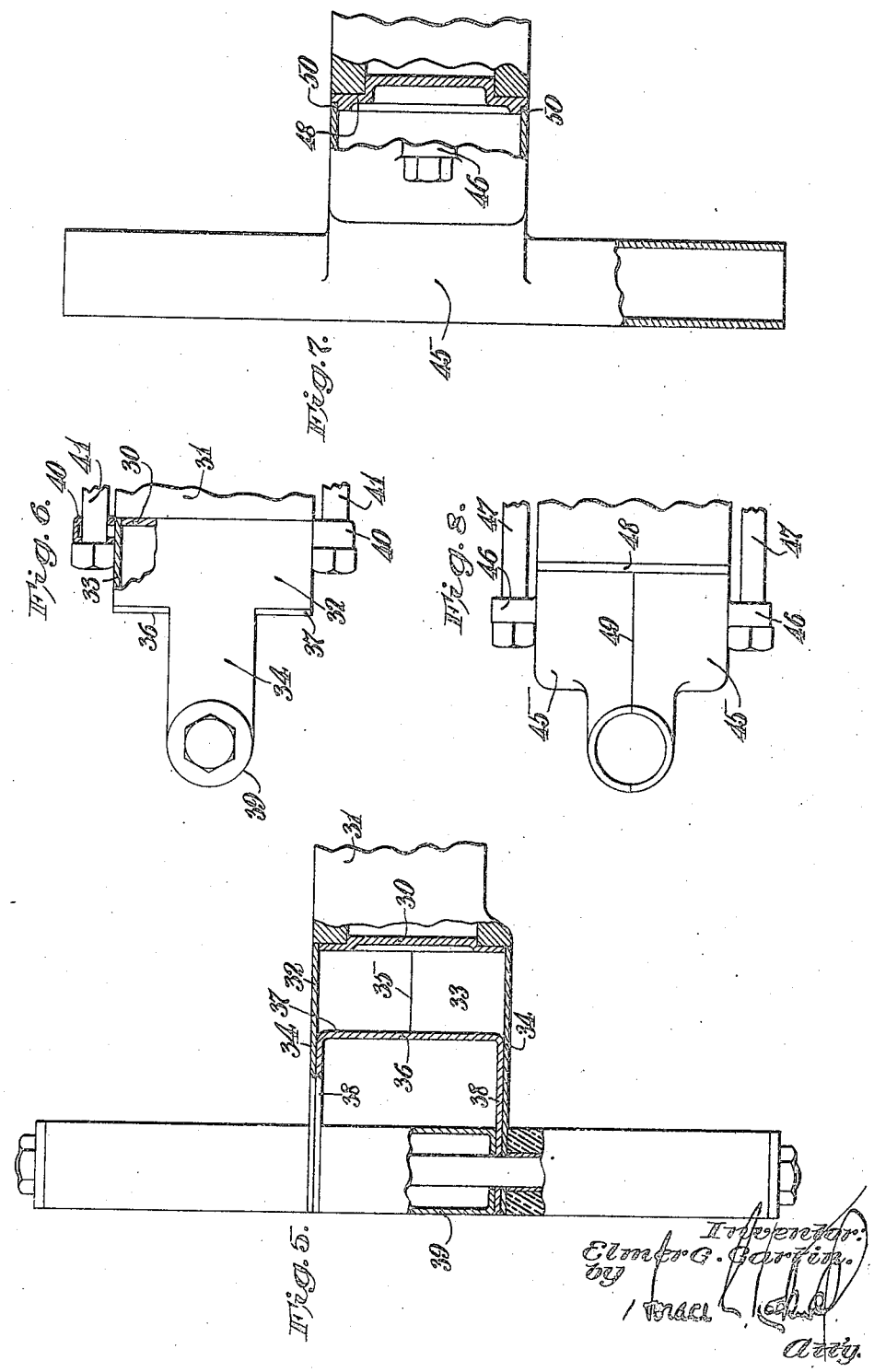

1,440,359

UNITED STATES PATENT OFFICE.

ELMER G. GARTIN, OF CLAREMONT, NEW HAMPSHIRE, ASSIGNOR TO SULLIVAN MACHINERY COMPANY, A CORPORATION OF MASSACHUSETTS.

TOOL HANDLE AND METHOD OF MAKING SAME.

Application filed February 2, 1920. Serial No. 355,556.

*To all whom it may concern:*

Be it known that I, ELMER G. GARTIN, a citizen of the United States, residing at Claremont, in the county of Sullivan and State of New Hampshire, have invented certain new and useful Improvements in Tool Handles and Methods of Making Same, of which the following is a full, clear, and exact specification.

My invention relates to tool handles.

The object of my invention is to provide an improved tool handle, and more especially, one adapted to use on percussive motors. A further object is to provide an improved, light and rigid tool handle of built up construction, which is readily manufactured, and which is relatively inexpensive. A further object of my invention is to provide an improved tool handle in which by the elimination of the core work, the cost of manufacture is considerably reduced and the possibilities of an imperfect element are minimized.

In the accompanying drawings I have shown, for purposes of illustration, four forms which my invention may assume in practice.

In these drawings,—

Fig. 1 is a side elevation of a motor provided with a handle embodying one of the illustrative forms of my invention, parts of the handle being shown in section to illustrate construction.

Fig. 2 is a fragmentary elevation of a slightly modified form of the handle at right angles to Fig. 1.

Fig. 3 is a section on the line 3—3 of Fig. 1.

Fig. 4 is a fragmentary view corresponding in position of the parts to Fig. 1 and showing a modified form of construction.

Fig. 5 is a view corresponding in position of the parts to Fig. 1 and showing a further modified form of handle.

Fig. 6 is a view at right angles to Fig. 5 with parts broken away to show the details of construction.

Fig. 7 is a view mainly in elevation but with parts broken away showing a further modified form of my construction.

Fig. 8 is a view at right angles to Fig. 7 showing the end of the handle.

In Fig. 1 I have shown a percussive motor indicated generally by the number 1 provided with an improved handle of one type which I have shown for illustration.

In this construction the tool motor is provided with a rear cylinder head 2 which is formed of a steel forging turned to the proper dimensions as shown in Figs. 1 and 3, and projecting from the rear end of the head is a lug 3, so shaped as to extend to substantially the outside edge of the head and turned upon its edge to provide a surface concentric to and in line with the periphery of the head proper. At the end of the lug 3 and concentric with the head is a threadedly secured bolt 4. In order to form an oil reservoir, I have provided upon the rear head 2, a housing 5 pressed out of sheet metal and adapted to be mounted between the bolt 4 and the head 2. This housing is rigidly secured to the head by a welded joint which also insures freedom from leakage around the junction with the head. The lug 3 is provided with a transverse passage 6 opening at opposite ends into the chamber 7 formed between the head 2 and the cap member 5, and extending radially from the periphery of the lug, and passing through the cap member 5 is a passage 8 intersecting the transverse passage 6. The passage 8 is closed at its outer end by a screw plug 9 and serves as a means for filling the hollow head with lubricant. To provide a handle for the tool I have employed strips 11 which are formed of sheet metal of suitable thickness and bent flat on themselves in such manner as to provide a double thickness at the point traversed by the handle bolt and having the two ends so shaped that one end lies parallel to the axis of the tool and adjacent the side of the head and the other end, which is bent at right angles, abuts the rear surface of cap member 5. These ends are secured in any suitable manner, but preferably by electric welding to the head 2 and to the cap member 5, thereby providing a rigid connection between the handle support and the head member 2. Arranged between the rearwardly extending portion of the handle supports is a hollow sheet metal member 14 adapted to support the former against bending by the handle bolt 15, and the handle bolt is extended through holes 16 and 17 formed respectively in the rearwardly projecting handle members and in the support member 14. To the outside of the handle members are arranged sleeves 18 and rubber grips 19, all the parts being held together by washers 20 and nuts 21 cooperating with the bolt 15. In this form of my construction the lugs 22 for the side rods 23 of the tool may be formed integral with the head, as shown in Fig. 2, but it will be obvious that they may, if desired, be formed separate from the head and welded to the handle members as shown in Figs. 1 and 4 at 24 and in section at 40 in Fig. 6.

In Fig. 5 I have shown another form of head member. In this construction I stamp out a member 30 adapted to form a rear head of the cylinder member 31 and weld it to a handle supporting or arm member 32 which is punched out of sheet metal and rolled on a mandrel to form an annular collar 33 with rearwardly extending ears 34, the joint in the collar 33 being preferably closed by welding as at 35. Cooperating with the member 32 and closing the rear end thereof, is a member 36 stamped out of sheet metal in the form of the circular closure plate 37 and with two projecting ears 38, and the ears are bent up to cooperate with the ears 34. The circular member 37 is welded into the rear end of the ring 33 and the ears 34 and 38 are preferably welded together. Cooperating with the ears is a handle constructed as described in the preceding description, the handle being generally designated as 39. In order to secure the head to the cylinder I have shown in Fig. 6 a pair of ears 40 which are formed of sheet metal stamped up in the form of a channel and ground or turned to fit the periphery of the ring member 33 and then welded to the latter to cooperate with side rods 41. It will be obvious that the enclosed chamber thus formed in the head member may serve as a lubricant reservoir and that any suitable supply plug may be used therewith.

In Figs. 7 and 8 I have shown another form which my invention may assume in practice. In this case, the handle is made up of two lateral portions 45 of pressed sheet metal, each of the portions forming respectively one-half of the handle member, one-half of the head member, and having pressed outwardly thereon one of the lugs 46 with which the side rods 47 cooperate. These two pressings are united by welding and closed at their end adapted to co-act with the tool cylinder by a stamping of sheet metal 48 which is welded to the head member, the weldings being respectively indicated at 49 and 50.

While I have not shown it in the drawings, as it per se forms no part of my invention, it is obvious that a suitable lubricant distributing means will be attached to my oil reservoirs and distribute lubricant therefrom to the cylinder or to the valve chest and thence to the cylinder, as may be desired.

While I have in this application specifically described several forms which my invention may assume in practice, it will be understood that these forms of the same are shown for purposes of illustration and that the invention may be modified and embodied in other forms without departing from its spirit or the scope of the appended claims.

What I claim as new and desire to secure by Letters Patent is:

1. A fluid pressure motor having a built up sheet metal handle.

2. In a fluid pressure motor, a combined handle and rear cylinder head comprising a machined cylinder closure element, an oil reservoir of sheet metal welded thereto, a pair of handle support members welded to said first mentioned members, and a handle secured to said support members.

3. In a fluid pressure motor, a combined handle and cylinder head comprising a cylinder head member, a pressed sheet metal oil reservoir secured thereto, sheet metal handle supporting members welded to said reservoir, and a handle secured to said supporting members.

4. In a fluid pressure motor, a machined cylinder head member provided with a laterally extending lug bored with lubricant conducting passages, a sheet metal oil reservoir cooperating with said first mentioned member and having a filling hole cooperating with said lubricant passage, and a handle provided with a pair of sheet metal handle support members welded to said oil reservoir and to said head member.

5. In a fluid pressure motor, a machined cylinder head member provided with a laterally extending lug bored with lubricant conducting passages, a sheet metal oil reservoir cooperating with said first mentioned member and having an opening to cooperate with said passages, a handle provided with a pair of sheet metal handle support members welded to said oil reservoir and to said head member, and lugs for the reception of assembly bolts formed of sheet metal and welded to the head member.

6. The method of manufacturing combined handle and cylinder head members for percussive motors comprising turning a forging to fit the bore of the cylinder, welding thereto a pressed sheet metal reservoir for lubricant, forming sheet metal handle supporting members, welding the same to said first mentioned members, and securing a handle to said handle supporting members.

7. The method of manufacturing combined handle and cylinder head members for percussive motors comprising turning a forging to fit the bore of the cylinder, welding thereto a pressed sheet metal reservoir for lubricant, forming sheet metal handle supporting members, welding the same to said first mentioned members, securing a handle to said handle supporting members, and welding to the lower end of said handle supporting members assembly bolt lugs.

8. In a fluid pressure motor, a cylinder, handle means associated therewith and comprising a handle and supporting means therefor comprising a plurality of welded sheet metal elements, and means for connecting said cylinder and handle means.

9. In a fluid pressure motor, a cylinder, and a manual supporting means for holding the same during work including a plurality of sheet metal elements welded together and bolted to said cylinder.

In testimony whereof I affix my signature.

ELMER G. GARTIN.